US009839921B2

(12) United States Patent
Yarina et al.

(10) Patent No.: US 9,839,921 B2
(45) Date of Patent: Dec. 12, 2017

(54) MODULAR CENTRIFUGE DEVICES AND METHODS

(71) Applicant: SISU GLOBAL HEALTH, INC., Baltimore, MD (US)

(72) Inventors: Carolyn Reed Yarina, Chassell, MI (US); Alexander Matthew Thinath, Pittsburgh, PA (US); Nicholas James Cobane, Ann Arbor, MI (US); Jenna Marie Boeing, Bedford, MA (US); Melissa Ann Sweeney, Westport, CT (US); Kattlynn Shawn Chartier, Ferndale, MI (US); Dominic Frank Calabrese, Oak Brook, IL (US); Nathan Joseph Pastuzyn, Midland, MI (US); Hannah Grace Cheriyan, Farmington Hills, MI (US); Katherine Leslie Kirsch, Schoolcraft, MI (US); Naveed Arif Iqball, Ann Arbor, MI (US); Swetha Viswanatha, Ann Arbor, MI (US)

(73) Assignee: Sisu Global Health, Inc., Baltimore, MD (US)

( * ) Notice: Subject to any disclaimer, the term of this patent is extended or adjusted under 35 U.S.C. 154(b) by 0 days.

(21) Appl. No.: 14/776,687

(22) PCT Filed: Mar. 13, 2014

(86) PCT No.: PCT/US2014/025873
§ 371 (c)(1),
(2) Date: Sep. 14, 2015

(87) PCT Pub. No.: WO2014/160125
PCT Pub. Date: Oct. 2, 2014

(65) Prior Publication Data
US 2016/0030952 A1     Feb. 4, 2016

Related U.S. Application Data

(60) Provisional application No. 61/782,828, filed on Mar. 14, 2013.

(51) Int. Cl.
*B04B 5/04*        (2006.01)
*B04B 7/02*        (2006.01)
(Continued)

(52) U.S. Cl.
CPC .............. *B04B 9/00* (2013.01); *B01D 21/262* (2013.01); *B04B 5/0421* (2013.01); *B04B 7/02* (2013.01);
(Continued)

(58) Field of Classification Search
CPC ............ B04B 5/0421; B04B 9/00; B04B 9/08
(Continued)

(56) References Cited

U.S. PATENT DOCUMENTS 411,570 A * 9/1889 Beimling .............. B04B 5/0421
                                                        494/10
548,717 A * 10/1895 Metzger ................ B04B 5/0421
                                                        494/10
(Continued)

OTHER PUBLICATIONS

International Search Report received in PCT/US2014/025873, mailed Jul. 18, 2014.
(Continued)

*Primary Examiner* — Charles Cooley
(74) *Attorney, Agent, or Firm* — Aurora Consulting LLC

(57) ABSTRACT

A modular centrifuge device for separating fluid samples, including a housing having a modular power assembly mechanism for rotating samples with manual or electric power. A manual centrifuge device, including a housing having a power assembly mechanism for rotating samples with manual power, and a speed indicator for indicating if a (Continued)

predetermined speed has been reached and a time indicator for indicating if a predetermined or calculated time has been reached for rotating said samples operatively connected to the device. A method of centrifuging samples, by selecting a manual power mode or electric power mode on a centrifuge, rotating samples at a predetermined speed for a predetermined or calculated time, alerting a user that the predetermined speed and predetermined or calculated time have been achieved, and obtaining separated samples.

22 Claims, 13 Drawing Sheets

(51) Int. Cl.
*B04B 9/00* (2006.01)
*B04B 9/08* (2006.01)
*B04B 9/02* (2006.01)
*B04B 13/00* (2006.01)
*B01D 21/26* (2006.01)

(52) U.S. Cl.
CPC .............. *B04B 9/02* (2013.01); *B04B 9/08* (2013.01); *B04B 13/00* (2013.01)

(58) Field of Classification Search
USPC ........................................ 494/10, 20, 83–85
See application file for complete search history.

(56) References Cited

U.S. PATENT DOCUMENTS

| | | | | |
|---|---|---|---|---|
| 581,188 A * | 4/1897 | Wickson | ............... | B04B 5/0421 494/20 |
| 647,180 A * | 4/1900 | Feldmeier | ............. | B04B 5/0421 494/20 |
| 660,746 A * | 10/1900 | Bausch et al. | ........ | B04B 5/0421 422/72 |
| 725,832 A * | 4/1903 | Feldmeier | ................. | F16H 1/20 223/109 R |
| 742,801 A * | 10/1903 | Penn | ..................... | B04B 5/0421 494/20 |
| 934,833 A * | 9/1909 | Parker | ................... | B04B 5/0421 436/177 |
| 950,741 A * | 3/1910 | Berry | ..................... | B04B 5/0421 494/20 |
| 995,192 A * | 6/1911 | Spraley | ................. | B04B 5/0421 494/20 |
| 1,334,109 A * | 3/1920 | Mojonnier | ............ | B04B 5/0421 494/20 |
| 1,453,802 A * | 5/1923 | Miller | ..................... | B04B 11/00 248/310 |
| 1,769,889 A * | 7/1930 | McClaran et al. | .... | B04B 5/0421 494/20 |
| 1,991,925 A * | 2/1935 | Garver | .................. | B04B 5/0421 494/20 |
| 2,110,308 A * | 3/1938 | Nelson | ..................... | G01K 5/06 374/192 |
| 2,222,266 A * | 11/1940 | Rubissow | ................ | B01J 19/28 164/115 |
| 2,820,590 A * | 1/1958 | Walker | .................... | B04B 15/02 494/13 |
| 3,268,160 A * | 8/1966 | Talley | ..................... | A61C 19/00 494/16 |
| 3,460,749 A * | 8/1969 | Martin | .................. | B04B 5/0414 422/269 |
| 3,567,113 A * | 3/1971 | Stansell | .................... | B04B 5/00 494/11 |
| 3,648,927 A * | 3/1972 | Abbe | ......................... | B04B 5/04 248/311.2 |
| 3,666,171 A * | 5/1972 | Filz | ....................... | B04B 5/0421 494/20 |
| 3,750,941 A * | 8/1973 | Drucker | ................ | B04B 5/0421 494/16 |
| 3,778,232 A | 12/1973 | McMorrow, Jr. | | |
| 3,804,324 A * | 4/1974 | Sinn | .......................... | B04B 7/02 220/645 |
| 3,850,369 A | 11/1974 | Bull et al. | | |
| 4,738,655 A * | 4/1988 | Brimhall | ................... | B04B 9/02 494/10 |
| 5,242,370 A * | 9/1993 | Silver | ................... | B01L 3/5021 422/918 |
| 5,616,104 A * | 4/1997 | Mulenburg | ........ | A63B 21/0054 472/21 |
| 5,924,972 A * | 7/1999 | Turvaville | ............ | B04B 5/0414 494/11 |
| 6,837,843 B2 * | 1/2005 | Gazeau | ................. | B04B 5/0421 366/214 |
| 8,986,185 B2 * | 3/2015 | Del Vecchio | .............. | B04B 9/08 494/16 |
| 2008/0181823 A1 * | 7/2008 | Iszczyszyn | ............... | B04B 9/00 422/400 |
| 2008/0188365 A1 | 8/2008 | Dalla Piazza | | |
| 2011/0130263 A1 * | 6/2011 | Del Vecchio | ......... | B04B 5/0421 494/9 |

OTHER PUBLICATIONS

Written Opinion received in PCT/US2014/025873, mailed Jul. 18, 2014.

* cited by examiner

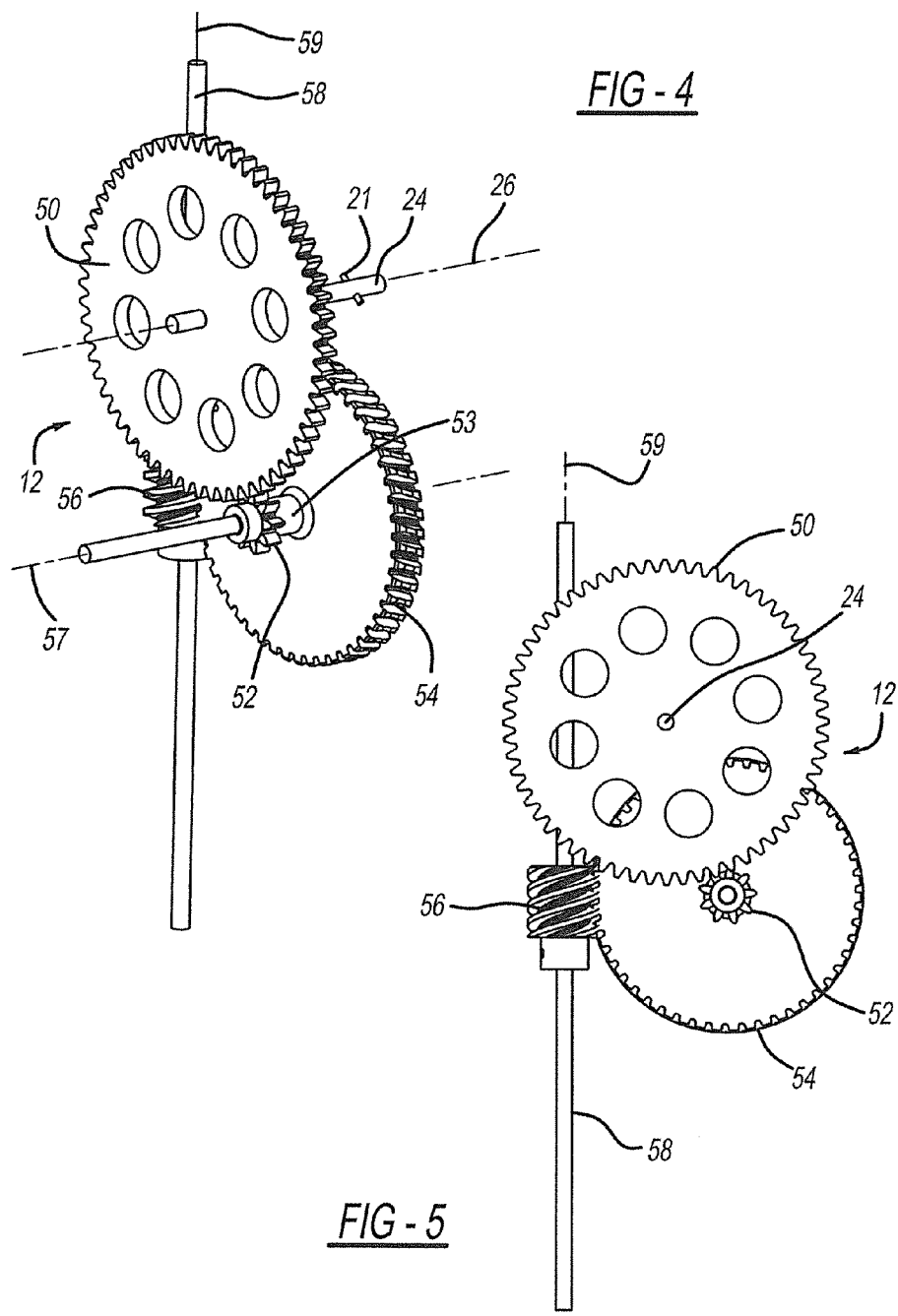

MODULAR CENTRIFUGE DEVICES AND METHODS

CROSS-REFERENCE TO RELATED APPLICATIONS

This application is the National Stage of International Application No. PCT/US2014/025873, filed Mar. 13, 2014, which claims the benefit under 35 U.S.C. §119(e) of U.S. Provisional Application No. 61/782,828, filed Mar. 14, 2013, each of which is herein incorporated by reference in its entirety.

BACKGROUND OF THE INVENTION

1. Technical Field

The present invention relates to centrifuges for the separation of bodily fluids. More specifically, the invention relates to manual power centrifuges.

2. Background Art

Centrifuges generally work by spinning contained fluid samples at a sufficiently high rate of rotational speed to cause separation of the fluids into their component parts by centrifugal force. Research laboratories and hospitals often use electrically powered centrifuges that typically plug into a wall socket. These centrifuges are often very large and are not designed to be portable.

Known manually-powered centrifuges have a base that is clamped to a stationary device, such as a table. A handle is mounted to the base and spins samples supported on a rotary wheel above the base. The standard translation of motion is through the handle driving a worm gear, which drives a worm, which then drives the rotary wheel and samples. The base is generally narrower than the rotary wheel, and must be clamped to a stationary device, such as a table, in order to provide balance for the base and the spinning samples.

Standard manually-powered centrifuge designs have several drawbacks. Examples include Supertek, SYHD (a hand centrifuge by OEM), Whirlybird Centrifuge, etc. These centrifuges list max speeds at 3,000 rpm, but the sustained speed is closer to 1,000. This means that the forces generated are not high enough for all applications, for example, spinning blood to push red blood cells below a gel tube (such as BD VACUTAINER® SST™ and PST™ gel tubes) to ensure the sample does not remix during transport would not work with these centrifuges. Also, the time required to use these centrifuges is too much for comfortable use. They require about 10 minutes to separate blood fully, which technicians (based on field feedback) are unwilling to do. Applicants have heard from multiple locations in India that previously had this type of centrifuge, and technicians reported that they were unwilling to spin the device for this time. The technicians would just stop when they were tired, around 2-4 minutes of spinning, and decide it was good enough. Thus, blood samples are not fully separated, leading to inaccurate test results.

These types of centrifuges do not have an indication of completion. Rural non-technical people in the developing world, or even rural technicians, are not accustomed to using stopwatches and are unaware of the importance of maintaining a task for a specified amount of time. One cannot rely on a rural minimally trained person to be able to time something with a watch/stopwatch for the proper time.

These centrifuges also lack safety. The tube holders spin openly, where they could be dangerous to anyone who sticks their finger in that area. This is a real consideration in rural and village areas: as said by doctors who run a mobile clinic in India, "villagers tend to poke things." There is also no containment if a tube holder breaks. These devices also have a c-clamp and therefore cannot be used without a table, which is unlikely to be available in a rural village setting.

The HANDYFUGE™ Plate Centrifuge (RPI) has a speed of 1,500 rpm/230 rcf obtained by pushing on a lever, and is specifically used for spinning down PCR plates. This device does have an enclosure and can be used on any flat surface, but is ineffective for similar reasons of speed as aforementioned standard manual centrifuges due to insufficient forces exerted on blood tubes. This device is also specifically tailored and marketed only for PCR plates and is not designed to fit standard blood tubes.

The Jabric manual centrifuge is able to reach high speeds of up to 5,000 G's with a complete enclosure of the samples. However, there is no indication that this is the "useable" speed, and in reality is likely lower as described above. The Jabric centrifuge is also nearly $1,000, making it unlikely to be affordable in rural areas and third world countries. If they could afford this price, a village could buy an electric generator and simply buy an electric centrifuge for around $50.

Multiple sources around the globe have come up with centrifuge designs out of readily available materials. These include a rural doctor in Nigeria at the Awojobi Clinic Eruwa who created both a bicycle-based and a hand-drill based centrifuge that reach 5,400 and 4,410 rpm, respectively. College students and professors have tried to solve the problem of a lack of an appropriate, affordable manual centrifuge by designing manual centrifuges out of salad spinners or egg beaters. Students at Rice University designed a salad-spinner-based centrifuge called the "sally centrifuge" that works for hematocrit only and only provides about 200 G force. An egg-beater based design reached 1,200 rpm or about 280 g-foce (8 minutes of spinning required for complete plasma separation). These designs have not been successful due to issues with portability and commercial scalability.

Therefore, there remains a need for a centrifuge that is at a commercially affordable price (such as less than $200), has an indication of proper time and speed, does not require mounting to a table, is safe, and is able to operate with manual power at speeds required for complete blood separation in less than 4 minutes. There is also a need for a centrifuge with the ability to alternate between use of manual and electric power.

SUMMARY OF THE INVENTION

The present invention provides for a modular centrifuge device for separating fluid samples, including a housing having a modular power assembly mechanism for rotating samples with manual or electric power.

The present invention also provides for a manual centrifuge device, including a housing having a power assembly mechanism for rotating samples with manual power, and a speed indicator for indicating if a predetermined speed has been reached and a time indicator for indicating if a predetermined or calculated time has been reached for rotating said samples operatively connected to the device.

The present invention also provides for a method of centrifuging samples, by selecting a manual power mode or electric power mode on a centrifuge, rotating samples above a predetermined speed for a predetermined or a calculated time, alerting a user that the predetermined speed and predetermined or calculated time have been achieved, and obtaining separated samples.

DESCRIPTION OF THE DRAWINGS

Other advantages of the present invention are readily appreciated as the same becomes better understood by reference to the following detailed description when considered in connection with the accompanying drawings wherein:

FIG. 4 is a schematic perspective illustration of an input shaft and a gear assembly of the centrifuge device of FIGS. 1-3;

FIG. 5 is a schematic side view illustration of the input shaft and gear assembly of FIG. 4;

DETAILED DESCRIPTION OF THE INVENTION

The present invention generally provides for a modular centrifuge device for separating fluid samples by either manual or electric power and methods of use thereof. The centrifuge device includes a housing with a modular power assembly mechanism for rotating samples with manual or electric power. Preferably, the samples are positioned at a bottom of the housing.

Figure 1:
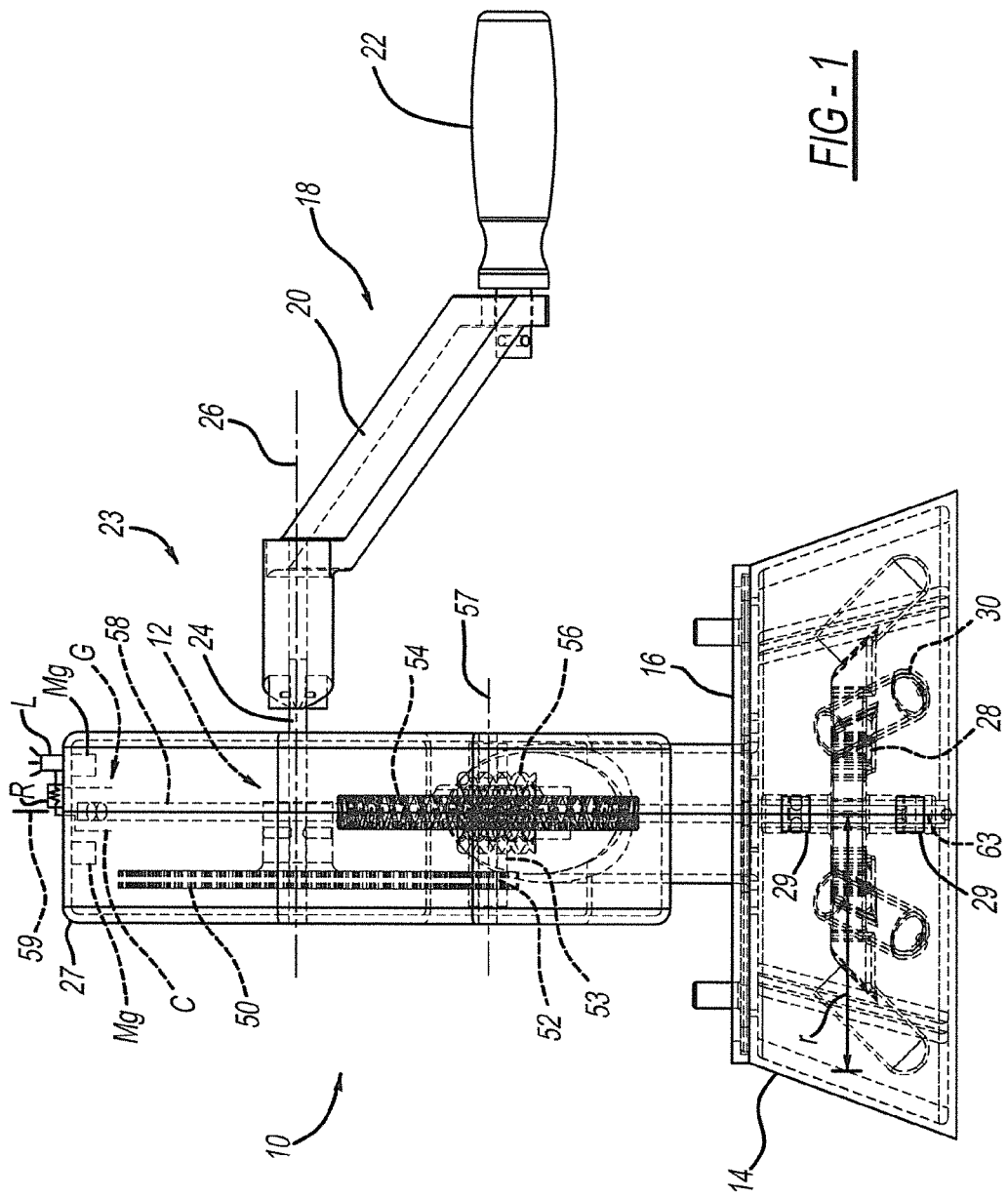
FIG. 1 is a schematic side view illustration of a centrifuge device showing components within a housing and base with hidden lines.

More specifically, referring to the drawings, wherein like reference numbers refer to like components throughout the several views, FIG. 1 shows a centrifuge device 10. As described herein, the centrifuge device 10 is adaptable to allow an initial generation of motion to be by manual power (i.e., hand powered), as shown, or to be powered by other methods such as by foot, or by electrical power received from a socket, from a solar panel, or from a battery (i.e. from an electrical power source). The centrifuge device 10 also includes an advantageous gear assembly 12 and a relatively large base 14 configured to be at the bottom 15 of the centrifuge device 10 during use.

The base 14 encloses sample containers 16 that hold bodily fluids to be separated. The position of the sample containers 16 near the bottom 15 of the centrifuge device 10, in the base 14, allows for increased stability and enables the centrifuge device 10 to be used on any relatively flat surface, rather than requiring that the centrifuge device 10 be clamped to a table or other stationary member. For example, the base 14 of the centrifuge device 10 can rest directly on the ground during operation in a free standing manner. The centrifuge device 10 can also rest in a free standing manner on a hood, or in a bed or cab of a vehicle during operation. The bottom 15 (shown in FIG. 14) of the base 14 can also be removable for easy access for cleaning, and can be secured with screws or any other suitable mechanisms. The base 14 can also optionally include open areas, such as at the bottom 15 or portions of the top.

As shown in FIG. 1, the centrifuge device 10 includes a handle 18 that has a lever arm 20 and a grip 22 connected to the lever arm 20. The lever arm 20 is connected to rotate in unison with an input shaft 24. Accordingly, when an operator holds the grip 22 and manually turns the handle 18 about a first axis of rotation 26, the input shaft 24 rotates about the first axis of rotation 26. Thus, a manual source of power can provide the initial generation of motion of the input shaft 24. The handle 18 can be rotated by a user horizontally or vertically, depending on the design and placement of the gear assembly 12.

The input shaft 24 extends through an opening 25 in a housing 27 that contains the gear assembly 12. The gear assembly 12 operatively connects the input shaft 24 to a rotatable sample carrier member 28. The rotatable sample carrier member 28 has a plurality of holders 30, each of which secures one of the sample containers 16 to the sample carrier member 28. The rotational motion of the input shaft 24 is transferred through the gear assembly 12 to rotate the rotatable sample carrier member 28. The containers 16 can contain bodily fluid that is separated into component parts by centrifugation due to the rotation of the rotatable sample carrier member 28. When the sample carrier member 28 is rotated, the holders 30 with the sample containers 16 swing out at an angle towards the horizontal axis from the vertical axis starting point at which the containers 16 are at rest. Preferably, the angle is from 45 to 89 degrees in order to use less space within the base unit 14, and more preferably, 80 to 89 degrees; however, other angles can also be used. The angle preferred can depend on the speed at which the holders 30 are rotated, and at higher speeds, higher angles can be preferred.

Figure 3:
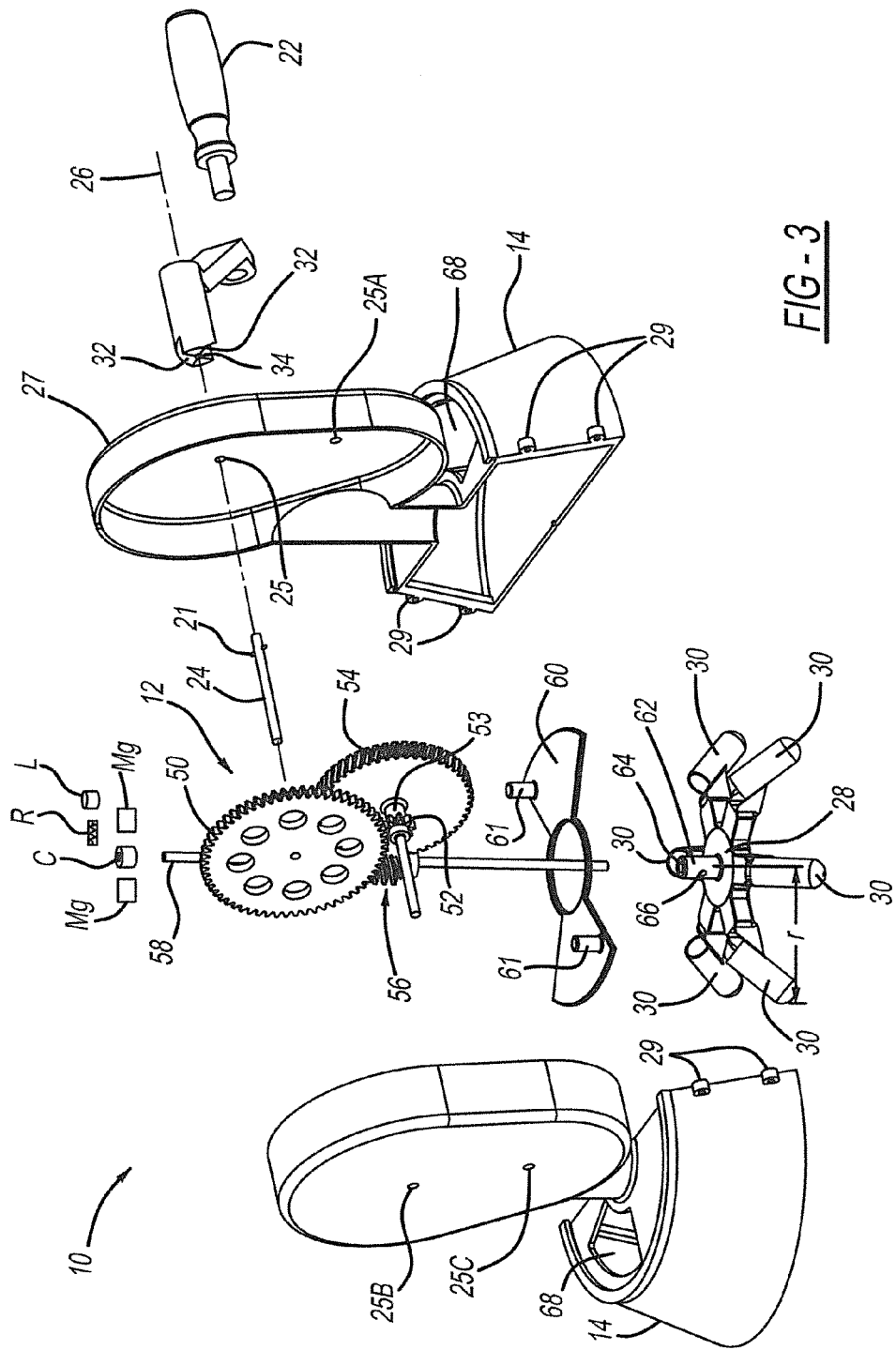
FIG. 3 is a schematic illustration in exploded perspective view of the centrifuge device of FIGS. 1 and 2.

As can be seen in FIG. 3, there are the six holders 30 in which containers 16 with samples of bodily fluid can be placed for separation; however, a different number of holders 30 can be used, such as 2, 4, 6, 8, or any other suitable number, to allow another number of sample containers 16 to be centrifuged at one time. The holders 30 and the sample carrier member 28 can be removed for cleaning. The holders 30 can also accommodate multiple sample container 16 sizes with a snap-in design. Holders 30 can also accommodate racks of sample containers 16. Any of the sample containers 16 or racks can be inserted or removed through access door 60 described below. Use of racks makes it easier to insert sample container 16 opposite each other when desired. Color coding of opposite sample containers 16 and/or holders 30 can further be used to facilitate easy insertion at the proper opposite sides of the sample carrier member 28 to ensure balance in the centrifuge during rotation. The holders 30 can further accommodate existing sample containers 16 that are used in existing electric centrifuges. The holders 30 also allow the sample containers 16 to be removed with forceps when users are unable to wear gloves.

The samples of bodily fluid can be any or all of blood, plasma, urine, sputum, spinal fluid, and saliva, or any other bodily fluid.

The input shaft 24, gear assembly 12, and handle 18 can be referred to as a power transfer assembly 23 that enables the rotational motion of the handle 18 to cause rotational motion of the sample carrier member 28, which thereby separates the bodily fluids in the containers 16 into their components by centrifugation. The power transfer assembly 23 is operatively connected to the sample carrier member 28.

Figure 2:
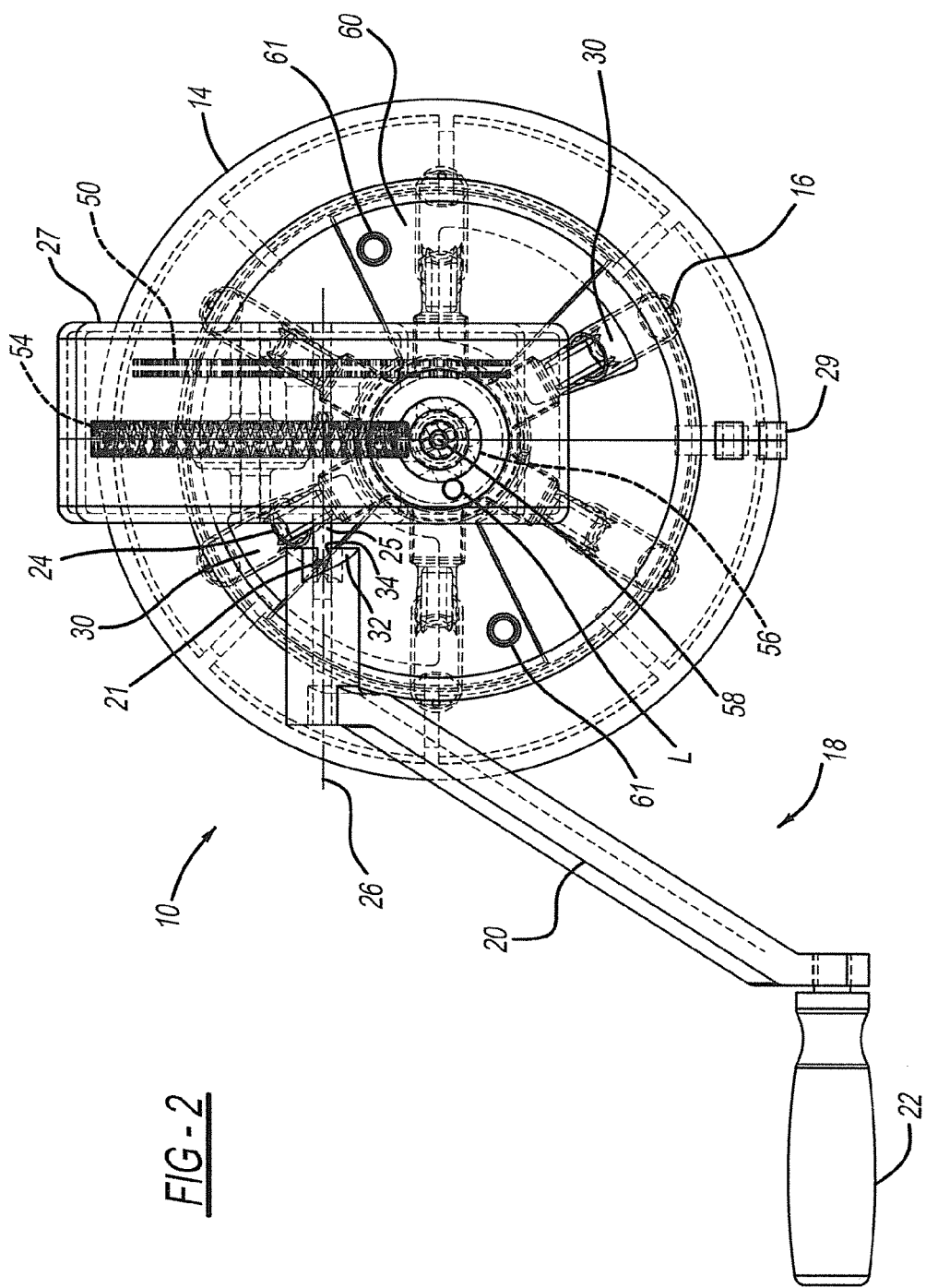
FIG. 2 is a schematic illustration in plan view of the centrifuge device of FIG. 1.

Alternate views of the centrifuge device 10 are shown in FIGS. 2 and 3. FIG. 2 shows a plan view of the centrifuge device 10 and FIG. 3 shows an exploded perspective view of the centrifuge device 10. It is apparent from FIG. 3 that the housing 27 and the base 14 are each formed in two halves. The housing 27 can be integrally formed with the base 14. The two halves of the housing 27 and base 14 connect to one another by fasteners that extend through openings 29 in the base 14. The housing 27 can be configured differently than shown, but the base 14 remains below the housing 27. An access door 60 can slide to an open position via a peg 61 to allow insertion and removal of the containers 16. The access door 60 is shown partially open in FIG. 10. As shown in FIG. 3, the access door 60 has two portions that cover two access openings 68 in the base 14.

The centrifuge device 10 can be powered by a different input power source by removing the handle 18 from the input shaft 24. The input shaft 24 is adapted to be operatively connected to another power input device, which generates the rotational motion of the input shaft 24 that drives the gear assembly 12. In FIG. 3, the handle 18 can disconnect from the input shaft 24 to be replaced by another power input device as described herein to allow other means of generating rotational motion that is transmitted through the gear assembly 12 to the sample carrier member 28, resulting in bodily fluid separation in the containers 16.

Specifically, an end of the arm 20 has recesses 32 and a central slot 34. The input shaft 24 fits into the slot 34. A roll pin 21 that is driven into the input shaft 24 rests against the arm 20 within the recesses 32 during operation. The handle 18 can be removed from the input shaft 24 by moving it away from the slot 34. The handle 18 can thus be replaced with another power input device to generate rotational motion of the input shaft 24 as long as the portion of the power input device configured to connect to the input shaft 24 has a shape similar to the end of the arm 20 (i.e., has a shape with recesses 32 and slot 34), or another complementary shape that allows the power input device to be retained to the input shaft 24. This option for modularity enables the centrifuge device 10 to be used in a variety of environments in which different forms of input energy are available. The centrifuge device 10 is a hybrid device that can be powered by human power (i.e. manually or by foot), or can selectively be electrically powered depending on the power input device used.

Figure 6:
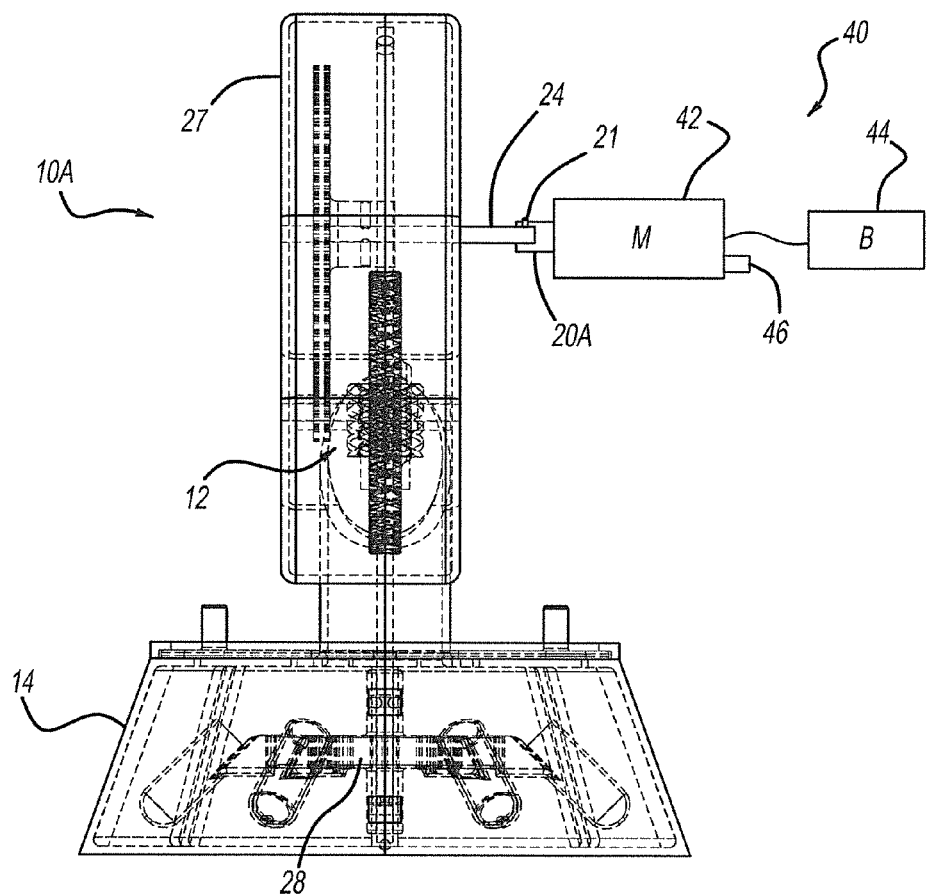
FIG. 6 is a schematic side view illustration of an alternate centrifuge device showing components within a housing and base with hidden lines, and with a handle removed and replaced by an electrical power device including a motor and a battery.

FIG. 6 shows a modified centrifuge device 10A in which the handle 18 of centrifuge device 10 is removed, and an electrical power device 40 is instead used as a power input device to provide rotational motion of the input shaft 24. Specifically, the electrical power device 40 includes an electric motor (M) 42 powered by stored energy in a battery (B) 44 to rotate the input shaft 24 when a switch 46 is triggered. An adapter 20A with a similar shape as the end of arm 20 (i.e., with recesses 32 and slot 34) fits to the input shaft 24 and the roll pin 21.

Figure 7:
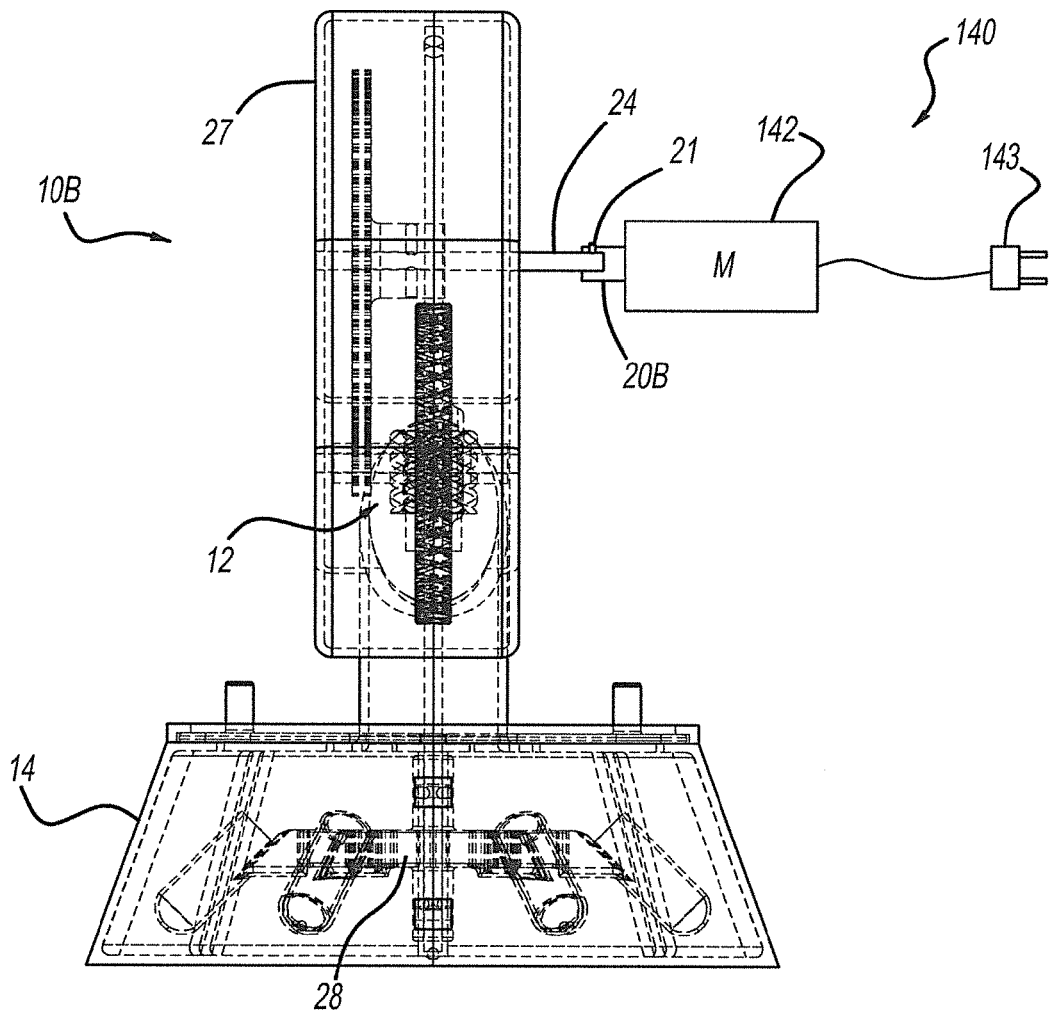
FIG. 7 is a schematic side view illustration of another alternate centrifuge device showing components within a housing and base with hidden lines, and with a handle removed and replaced by another electrical power device including a motor and a wall plug.

FIG. 7 shows another modified centrifuge device 10B in which the handle 18 of centrifuge device 10 is removed, and an electrical power device 140 is instead used as a power input device to provide rotational motion of the input shaft 24. Specifically, the electrical power device 140 includes an electric motor (M) 142 powered by electrical power provided when a plug 143 is plugged into a wall socket. An adapter 20B with a similar shape as the end of arm 20 (i.e., with recesses 32 and slot 34) fits to the input shaft 24 and the roll pin 21.

Figure 8:
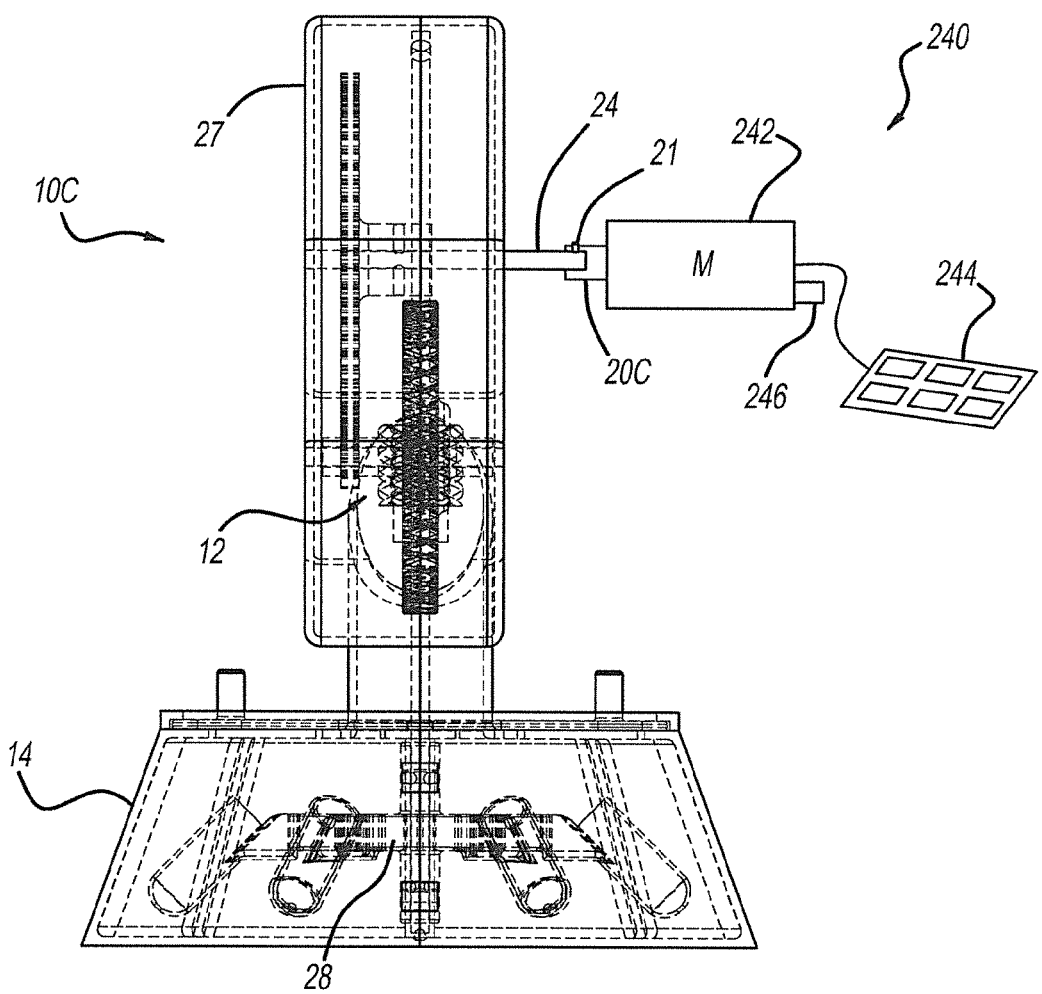
FIG. 8 is a schematic side view illustration of another alternate centrifuge device showing components within a housing and base with hidden lines, and with a handle removed and replaced by another electrical power device including a motor and a solar panel.

FIG. 8 shows another modified centrifuge device 10C in which the handle 18 of centrifuge device 10 is removed, and an electrical power device 240 is instead used as a power input device to provide rotational motion of the input shaft 24. Specifically, the electrical power device 240 includes an electric motor (M) 242 powered by electrical energy converted from solar power by a solar panel 244 with solar cells when a switch 246 is triggered. An adapter 20C with a similar shape as the end of arm 20 (i.e., with recesses 32 and slot 34) fits to the input shaft 24 and the roll pin 21.

One advantage of the electrical power device 40 and 140 of FIGS. 6-7 is the ability to maintain the speed of the motor 42 or 142 at a constant speed due to the constant level of power provided from the battery 44, or from the power source through the plug 143. This leads to a constant speed of rotation of the input shaft 24, and a constant speed of rotation of the sample carrier member 28, which is a higher speed than the speed of rotation of the input shaft 24 due to the gear assembly 12.

Figure 9:
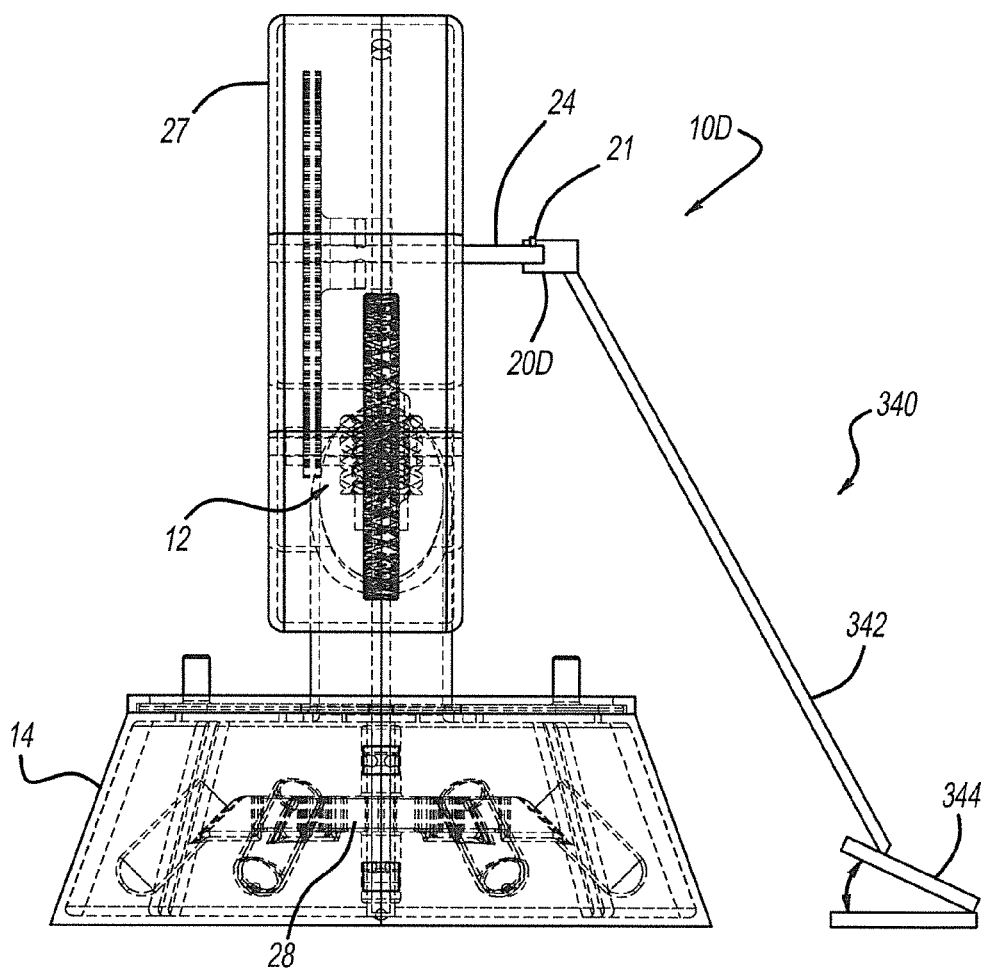
FIG. 9 is a schematic side view illustration of another alternate centrifuge device showing components within a housing and base with hidden lines, and with a handle removed and replaced by foot powered device.

FIG. 9 shows another modified centrifuge device 10D in which the handle 18 of centrifuge device 10 is removed, and a foot powered device 340 is instead connected to the input shaft 24 to provide rotational motion of the input shaft 24. Specifically, the foot powered device 340 includes torque transfer device 342 such as a lever, pulley, or rope that is mounted to the input shaft 24 and having a foot pedal 344. Pumping of the foot pedal 344 transfers torque to the input shaft 24 to cause rotation of the input shaft 24 through an adapter 20D in a similar manner as a pedal for a spinning wheel. The adapter 20D has a similar shape as the end of arm 20 (i.e., with recesses 32 and slot 34) so that if fits to the input shaft 24 and the roll pin 21.

Referring again to FIG. 1, the power transfer assembly 23 includes the input shaft 24, the gear assembly 12, and the power input device, which in the embodiment shown is the handle 18 but can instead be any of the power input devices of FIGS. 6-9. The gear assembly 12 converts the initial generation of rotational motion of the input shaft 24 into the rotational motion of the sample carrier member 28 and the containers 16 of bodily fluid supported thereon, resulting in the separation of the bodily fluid into its component parts.

The gear assembly 12 multiplies the rotational speed of the sample carrier member 28 relative to rotational speed of the input shaft.

FIGS. 4 and 5 show different views of the gear assembly 12 including a first gear, which is a large spur gear 50, mounted to rotate in unison with the input shaft 24 about the first axis of rotation 26. The gear assembly 12 further includes a smaller second gear, referred to as a spur gear 52, which is supported on a second shaft 53. The spur gear 52 meshes with and is driven by the large spur gear 50. Another relatively large gear, referred to as a worm gear 54, is mounted to rotate on the second shaft 53 in unison with (i.e., at the same speed as) the spur gear 52. The second shaft 53, the spur gear 52 and the worm gear 54 rotate about a second axis of rotation 57. A worm 56 with spiral cut teeth is mounted on a third shaft 58 and engages the worm gear 54. The third shaft 58 and the worm 56 rotate about a third axis of rotation 59. The rotatable carrier member 28 is mounted on the third shaft 58 to rotate with the third shaft 58. FIG. 3 shows a central mount 62 in the carrier member 28 that has an opening 64 configured to receive the third shaft 58. A screw can be extended through an opening 66 in the central mount 62 and tightened against the shaft 58 within the mount 62 so that the central mount 62 and the entire carrier member 28 will rotate in unison with the third shaft 58. The end of the third shaft 58 rests on a ball bearing 63 that is positioned on the base 14 to allow the third shaft 58 and worm 56 to rotate with minimal friction relative to the base 14. In other words, the sample carrier member 28 is supported by the base 14 through a friction minimizing device, which can be the ball bearing 63 or any other suitable device. Any of the motors (M) described herein can also be directly connected to the third shaft 58 so that the motors (M) directly turn the sample carrier member 28 and the containers 16 of bodily fluid, instead of turning the various gears described above. Alternatively, when a motor (M) is added to the device 10, the gear assembly 12 can be replaced with one specifically designed for the motor (M). Also, any or all of the worm gears described above can be replaced with spur gears (generally shown at 51) so as to not have a plane change, such as in FIG. 14. In this case, all three shafts are rotated by spur gears 51. Also, the gear assembly 12 can be configured to include more or fewer shafts in order to rotate the sample carrier member 28. In another alternative, the gear assembly 12 can be replaced with a belt system or assembly.

Figure 10:
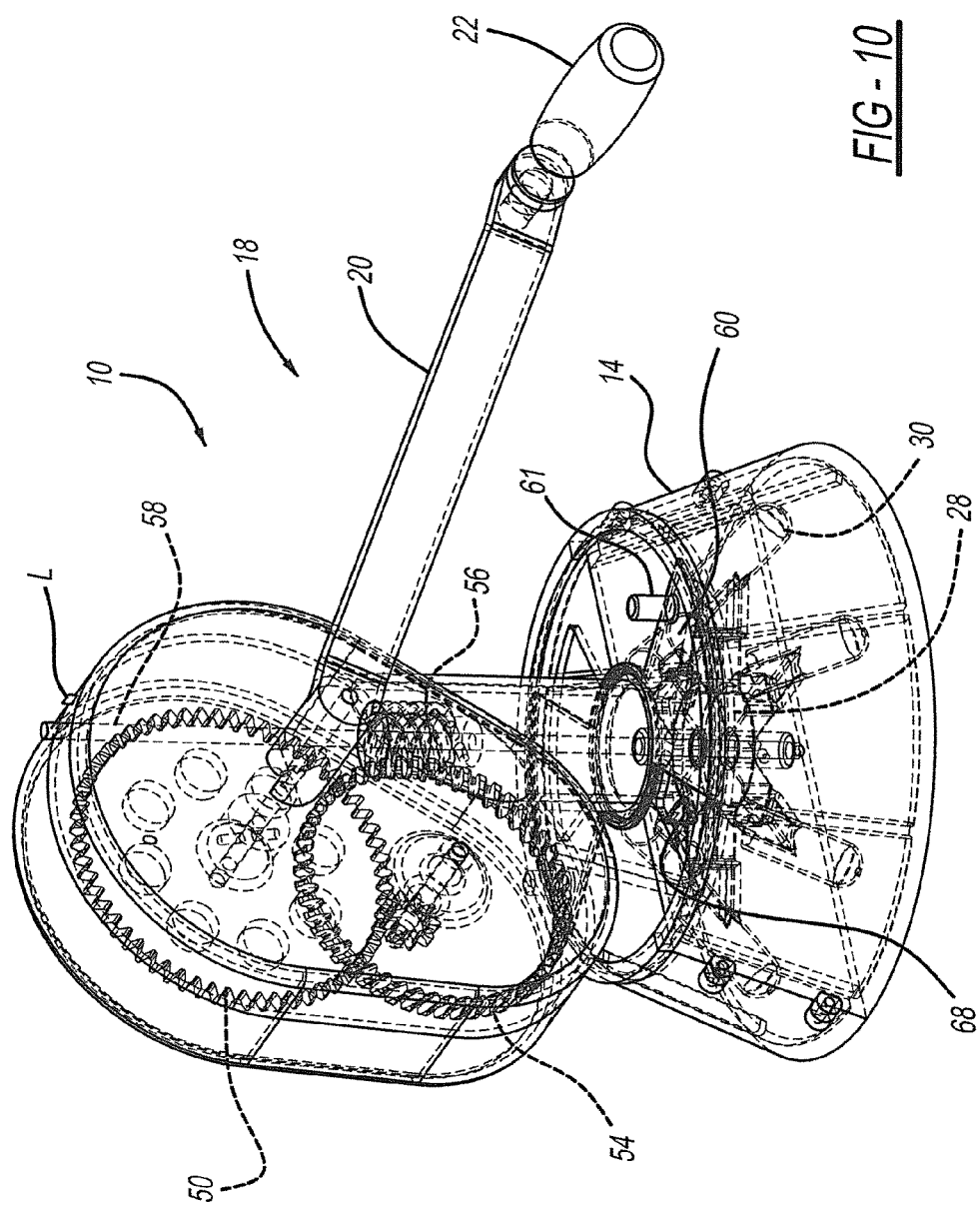
FIG. 10 is a schematic perspective illustration of the centrifuge device of FIG. 1 showing an access door partially open and showing components within a housing and base with hidden lines.
Figure 11:
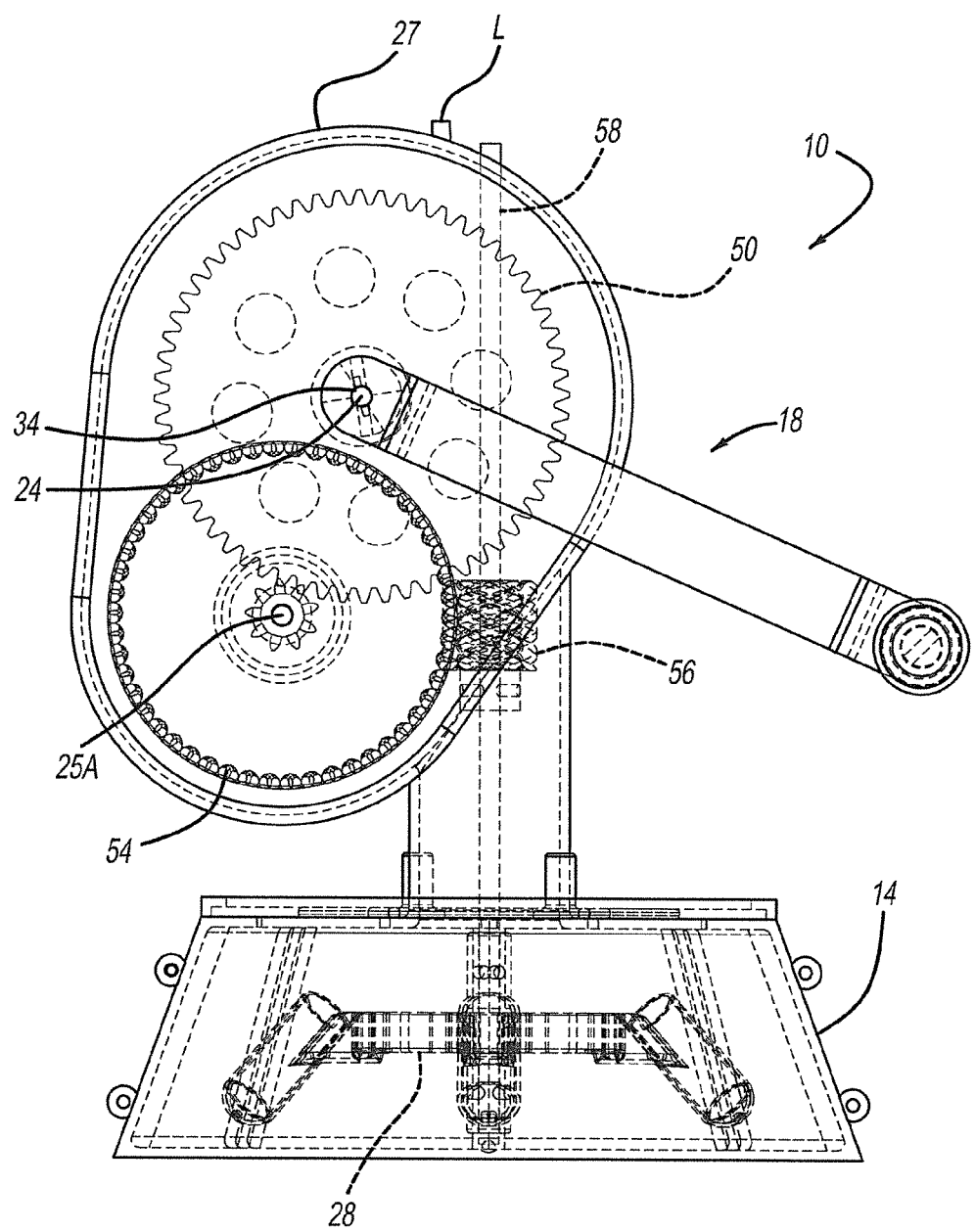
FIG. 11 is a schematic front view illustration of the centrifuge device of FIG. 1 showing components within a housing and base with hidden lines.
Figure 12:
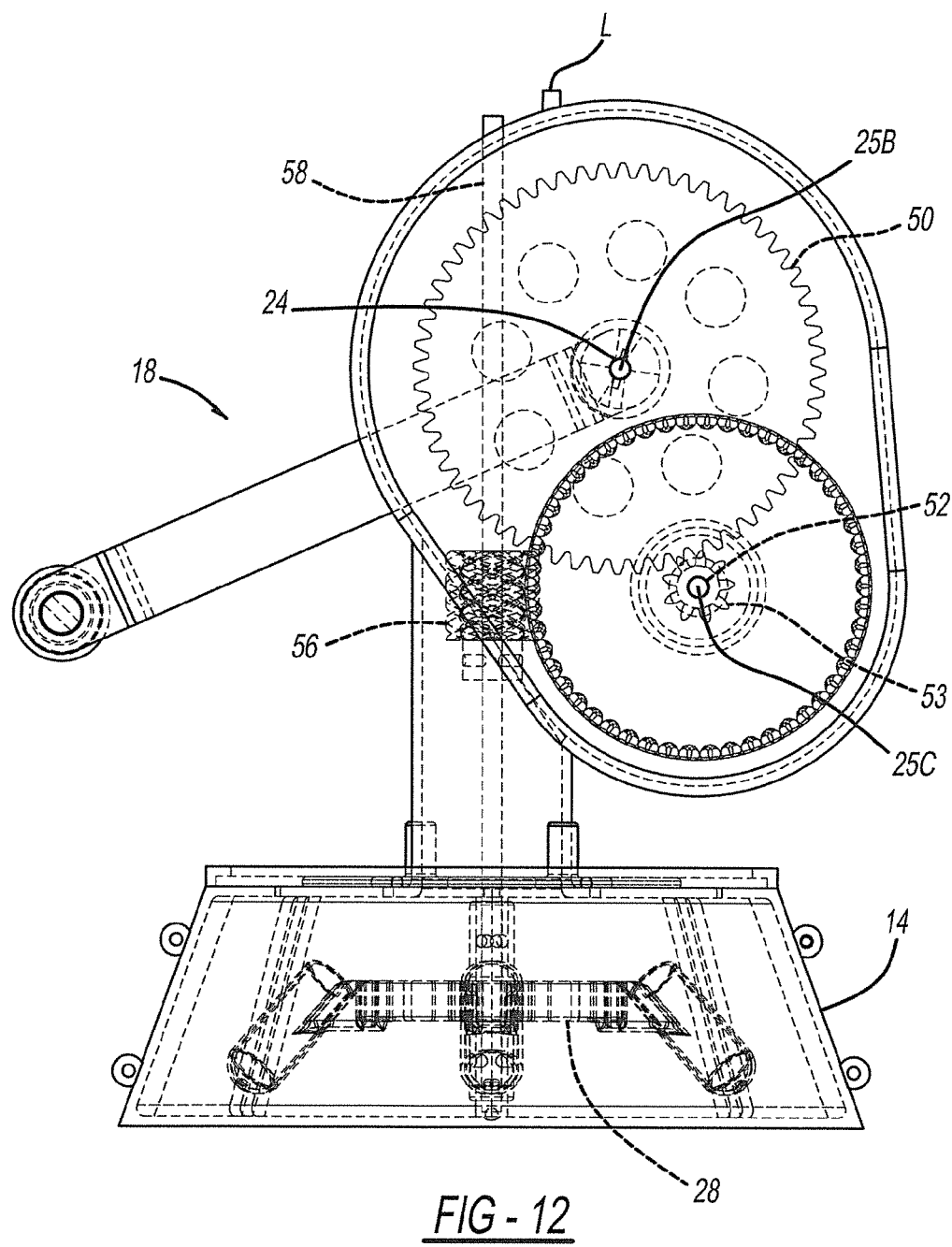
FIG. 12 is a schematic back view illustration of the centrifuge device of FIG. 1 showing components within a housing and base with hidden lines.

FIGS. 10, 11, and 12 show additional views of the centrifuge device 10. It is apparent in FIGS. 10, 11, and 12 that the two halves of the housing 27 can have openings at which the input shaft 24 and a central portion of the second shaft 53 are rotatably supported. These openings include the opening 25 through which the input shaft 24 extends to connect with the handle 18 or other power input device, as well as openings 25A, 25B, and 25C.

Figure 13:
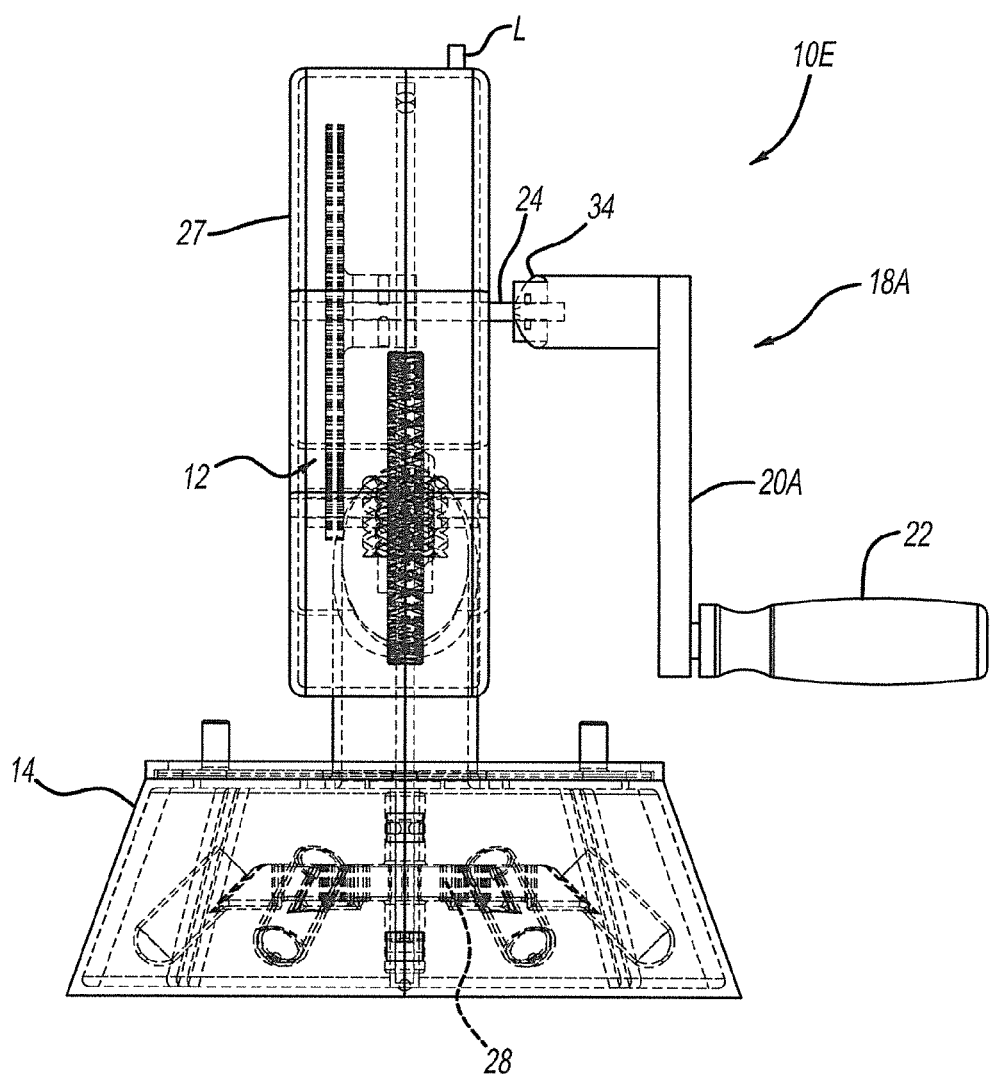
FIG. 13 is a schematic side view illustration of a centrifuge device with an alternate handle and showing components within a housing and base with hidden lines.

FIG. 13 shows an alternate centrifuge device 10E alike in all aspects as centrifuge device 10 of FIG. 1 except that the handle 18 is replaced with an alternate handle 18A that has an arm 20A with a portion that extends downward at a right angle to the input shaft 24.

Accordingly, in the gear assembly 12, the input shaft 24 drives the spur gear 50, which in turn drives the spur gear 52 and worm gear 54. The worm gear 54 meshes with and drives the worm 56 and the sample carrier member 28. The sample carrier member 28 can be operatively connected to rotate in unison with the worm 56. The worm gear 54 and the worm 56 are configured with a gear ratio causing an increase in rotational speed of the worm 56 relative to the worm gear 54. In one embodiment, the spur gear 50 has 60 teeth, spur gear 52 has 9 teeth, and the tooth ratio of the worm gear 54 to the worm 56 is 12.5:1. The tooth counts and tooth ratios of the gears 50, 52, 54, 56 can generate rotational speeds of the carrier member 24 and the containers 16 of bodily fluids of over 3000 revolutions per minute (rpm), and a relative centrifugal force (RCF) of 2000 Gs. These numbers are based upon the assumption that the initial generation of motion at the input shaft 24 occurs at a standard rotational speed of 45 rpm; that is, the speed of the input shaft 24 is 45 rpm. It is relevant to note that relative centrifugal force (RCF) for the centrifuge device 10 of FIG. 1 is a function of the rotational speed (rpm) squared times the radius r of the sample carrier member 28 from the center of the sample carrier member 28 to the furthest (most radially outward) tip of the container holder 30 shown in FIG. 1. The standard formula for RCF is $(1.11824*10-5)*r*RPM2$, where r is the radius in centimeters of the sample carrier member 28 as described herein, and RPM is the rotational speed of the sample carrier member 28 in revolutions per minute (and of the worm 56 and third shaft 58). The number of teeth on each gear 50, 52, 54, or the radius r of the rotatable sample carrier 28 could be adjusted to either increase or decrease the RCF. One example of use of the device 10 is to turn the handle 18 at 45 rpm for 3.5 minutes. It should be understood that the rotational speed of the handle 18 is the same as the rotational speed of the input shaft 24.

Figure 14:
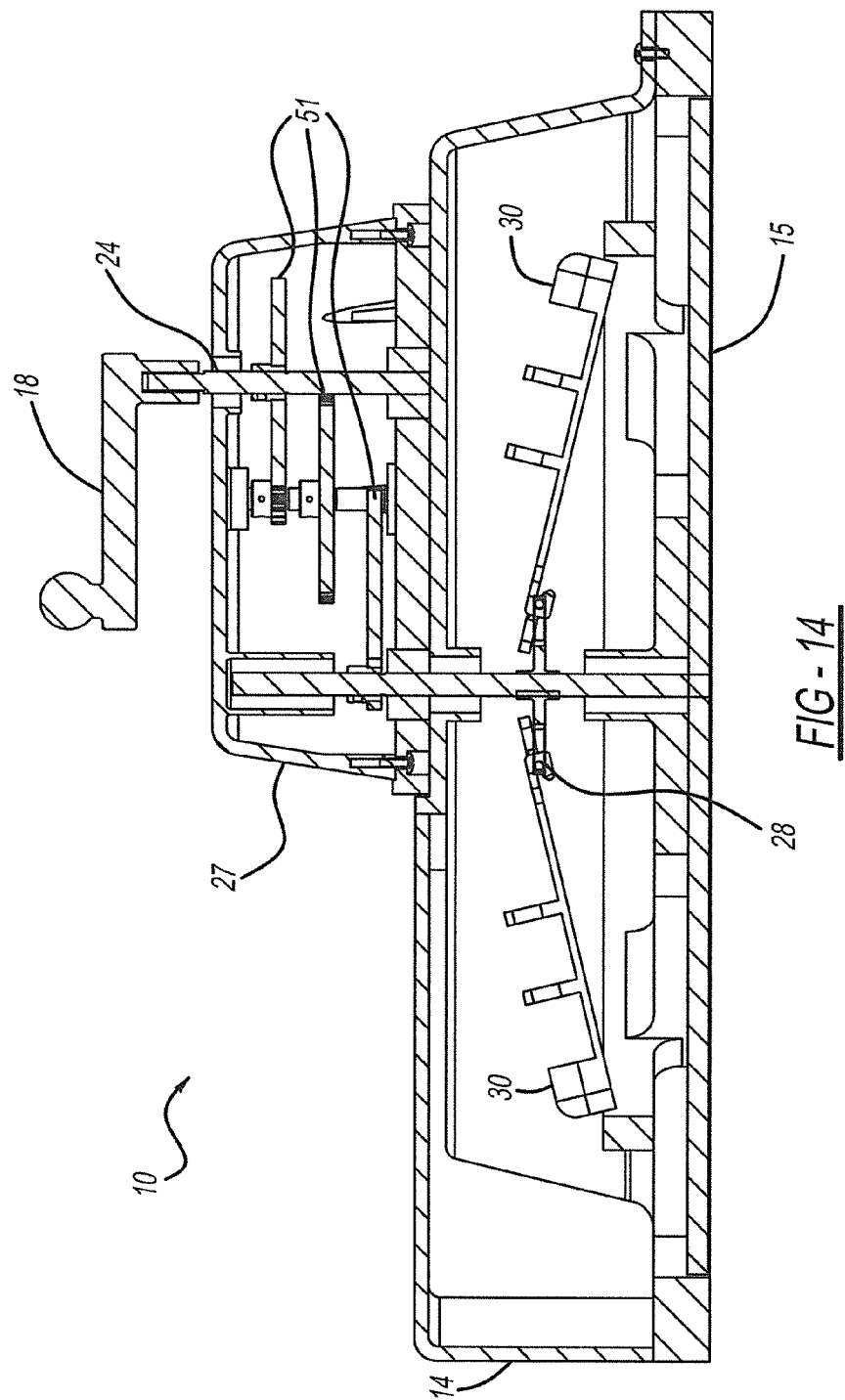
FIG. 14 is a cross-sectional view of the centrifuge device with spur gears.

FIG. 14 shows an alternate configuration of the centrifuge device 10 wherein only spur gears 51 are used to drive the sample carrier 28, and no worm gears are used. In this configuration, the housing 27 is located on top of the base unit 14, and the handle 18 is operatively attached to the top of the housing 27 instead of on the side as in the previous FIGURES. Thus, rotation occurs in a horizontal plane instead of a vertical plane. For modularity, the handle 18 can be pressed down in order to engage the gears, and can be pulled up to engage a motor (which can also be located within the housing 27). In this way, the device 10 can easily switch between manual power and electric power and the handle 18 can be toggled to select manual or electric power.

The centrifuge device 10 can include a speed indicator feature operatively connected to the sample carrier member 28 and operable to indicate if the rotational speed of the carrier member 28 has reached a predetermined speed. Alternatively, the speed indicator feature can be located at any suitable part of the centrifuge device 10, such as, but not limited to, a gear or a shaft, and a calculation can be performed to determine or predict the speed of the sample carrier member 28. The predetermined speed can be the speed required to generate the proper centrifugal force to cause separation of the bodily fluids in a designated amount of time in the containers 16. In one embodiment, the speed indicator feature can be a light that is powered by the rotational motion of the gear assembly 12 and is configured to require a predetermined amount of current to illuminate. The predetermined amount of current can be that amount generated via rotation of the sample carrier member 28 at the predetermined speed. In other words the light turns on once the predetermined speed is reached. The centrifuge device 10 can also include a time indicator operatively connected to the sample carrier member 28 (or any other suitable place) and the speed indicator feature. The time indicator indicates that the centrifuge device 10 has been spun at the predetermined speed for a predetermined or calculated time. The time indicator can optionally calculate the input speed and use that calculation to determine the needed time to separation of the samples. The time indicator can also display the amount of time needed at that particular input speed to operate the centrifuge device 10 in order to separate the samples. The time indicator can turn on or change color once the predetermined or calculated time has been reached when rotation is occurring above or at the predetermined speed. The time indicator can also be a light, and can be a different color than the speed indicator or the same color. For example, the speed indicator can be red and the time indicator can be green, or the speed indicator and the time indicator can be green. The speed and time indicators can be located anywhere appropriate on the device 10, such as on the housing 27.

For example, referring to FIG. 1, a small generator of electricity G can be mounted inside the housing 27 to the third shaft 58 or to another rotating member. The generator G can power a microcontroller that analyzes the speed of the rotating body it is measuring (i.e. any of the shafts, gears, belts, sample carrier member 28, etc. as described above) in order to determine and indicate the speed of the sample carrier member 28 and containers 16. The microcontroller can use this calculation to further determine the amount of time required to separate the sample as described above. Most preferably, the generator G is a battery. Alternatively, the generator G can include a coil C that rotates with the third shaft 58 and a magnet Mg mounted to the inside of the housing 27 so that it is positioned around the coil C within the housing 27. Alternatively, the magnet Mg can be mounted to rotate with the third shaft 58 or with another rotating member of the centrifuge device 10, and the coil C can be mounted to a stationary (non-rotating) member, such as the housing 27. A light L is connected to the coil C which carries a current due to magnetic flux and electromotive force produced when the third shaft 58 rotates, causing the light L to illuminate when sufficient current is generated. To ensure that the light L illuminates only when the predetermined rotational speed is achieved or exceeded, an external resistor R is connected in series with the light L. Therefore, the light L will illuminate only when greater than a particular predetermined voltage drop occurs across the light L. Because the resistance of resistor R is constant, the voltage drop is a function of current which is ultimately a function of rotational speed. Although shown only on centrifuge device 10, the generator G with coil C and magnet Mg and the light L can be used on any of the embodiments described herein.

Furthermore, the speed and/or time indictor feature can instead be a control sample of fluid in one of the containers 16 that can mimic the separation of the bodily fluid and is known to separate into components when a predetermined centrifugal force has been applied for a predetermined amount of time. The control sample can be periodically visually checked to determine whether sufficient processing has occurred to achieve proper separation of the test samples in the containers 16. The speed and/or time indicator feature can also be any other suitable mechanisms that provide an alert at a predetermined speed and/or a predetermined or calculated time, such as, but not limited to, sound alerts (i.e. beeping), or moving/mechanical alerts (i.e. a "jack in the box" where an indicator pops up from a resting state). The centrifuge device 10 can also include additional alerts in a type described above, such as, but not limited to, when access door 60 has been left open.

Once the centrifuge device 10 has been operated at or above the predetermined speed and the predetermined or calculated time, it is essential that the sample containers 16 slow down gradually so as not to remix the sample therein. Therefore, the centrifuge device 10 can include any appropriate slowing mechanism that slows down the rotation of the gears (and thus rotation of the sample container member 28 and containers 16) gradually once operation (whether manual or electric) has stopped.

The present invention also provides more specifically for a manual centrifuge device as described above, including a housing having a power assembly mechanism for rotating samples with manual power, and a speed indicator for indicating if a predetermined speed has been reached and a time indicator for indicating if a predetermined or calculated time has been reached for rotating said samples operatively connected to the device. Each of these parts have been described above.

Most generally, the present invention provides for a method of centrifuging samples, by optionally selecting a manual or electric power mode on a centrifuge, rotating samples at a predetermined speed for a predetermined or calculated time, alerting a user that the predetermined speed and predetermined or calculated time have been achieved, and obtaining separated samples.

More specifically, the user first adds samples to the sample containers and the sample containers are then inserted in the sample carrier member at the bottom portion of the centrifuge. The user balances the containers if necessary within the sample carrier member. The access door is closed. The user can select to use either manual power of electric power in order to rotate the input shaft in order to rotate/spin the sample carrier member. Alternatively, if the modular device is not being used but rather the manual device, no selection is needed. The centrifuge device can also easily be switched between manual and electric power by replacing the handle (or toggling the handle to engage) with an electrical power source to drive the input shaft. In the manual power mode, the user turns the handle (or operates the foot pump) at an appropriate speed for an appropriate time to separate the samples within the containers. The handle essentially drives the input shaft and gear assembly to spin the sample carrier member. Preferably, the user turns the handle at 35 rpm for 3.5 minutes, but any other suitable speed and time can be used. Once the predetermined speed has been reached, the speed indicator can turn on as described above. Once the predetermined or calculated time at that speed has been reached, the time indicator can also turn on as described above. The user stops turning the handle or the electric motor stops and the rotation of the sample carrier member with the samples can gradually slow down. The access door can be opened and the containers with the separated samples removed from the sample container. At this point, further tests can be performed on the separated samples, such as, but not limited to, dengue fever, syphilis, typhoid fever, diabetes, HIV, malaria, etc.

The centrifuge device of the present invention has several critical advantages over prior art manual centrifuges. The centrifuge device is a modular device and is able to be easily operated with either manual power or electric power when available. This saves rural clinics money because they do not have to buy a separate device for when or if they have electric power available. There is a complete enclosure of the samples within the centrifuge, so that the centrifuge device can operate safely in environments where people are not used to such devices. The centrifuge device is able to operate at high enough speeds (i.e. 2000 rpm or more) to effectively separate samples of bodily fluid, and especially blood or plasma. This speed is able to be achieved even with manual power. The centrifuge device is designed to not require clamping to any object but rather is free standing. In order to accomplish this, the gears are positioned at the top of the centrifuge device whereas the sample container is positioned at the bottom. The centrifuge device includes light indicators that easily show an operator that the correct speed and time have been achieved for spinning samples. Furthermore, because of the speed that the centrifuge device is able to operate at, the time required to spin samples is much less than previous manually powered devices. This ensures that the centrifuge device is used properly in a rural village setting.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

EXAMPLE 1

Use case 1: Mobile Clinic: The need and specifications for the centrifuge device were developed through observation and travelling with a mobile clinic in the areas around Sargur, India. In this setting, diagnostic equipment was limited to a stethoscope. If a serious condition, such as Typhoid Fever, was suspected, a blood sample would be drawn and transported back to the main lab if they could get it back while the blood was still accurate for diagnostic tests. According to blood lab technicians in India, whole blood at room temperature is only good for 3 hours for most tests, but plasma is good for up to 3 days. At the lab they would centrifuge the blood and run a Rapid Diagnostic Test (RDT). Simply the presence of a device such as the present invention would allow immediate blood separation, testing with an RDT and diagnosis on location. The Swami Vivekananda Youth Movement (SVYM) expressed interest in purchasing a device such as the invention for their mobile clinic for this reason. SVYM was aware of the existing standard manual centrifuge design. They cited reasons for insufficient speed, too much time required for blood separation and the device's reliance on a stopwatch to know when the sample was fully separated. The long amount of time to separate blood and poor ergonomics made the standard manual centrifuge unpopular and most people did not want to use it. The requirement of a person using the centrifuge to be reliant on a stopwatch was an issue because the person operating the centrifuge often had limited training and education, meaning that using a stopwatch was not intuitive or a standard part of their culture; therefore, the device was used improperly and not spun for the proper time, leading to inaccurate test results.

Use case 2: Pregnancy clinic: In Karnataka, India, Applicants witnessed a pregnancy clinic for expecting mothers. A doctor and a phlebotomist were driven to a village schoolhouse where the pregnant women of the community had been told to attend. The doctor brought equipment comprised of a stethoscope, scale, electric centrifuge, syringe, and non-electric diagnostic tests with them to the village. Applicants saw each pregnant woman go through prenatal testing including having their blood drawn, separating the blood using the electric centrifuge, and then having a battery of tests run to test the expectant mother's health. Applicants were told by a doctor and administrator of the organization that ran the pregnancy clinic that the clinic was reliant on the electric centrifuge and therefore reliant on the presence of electricity. Applicants were told that 40% of the time the doctor and phlebotomist would arrive for the pregnancy clinic only to cancel the clinic because there was a power cut at that time and no electricity. Applicants were told that a device such as the present invention would be ideal. The clinic wanted a device that could run on electricity when it was present.

Use case 3: semi-urban clinic: In multiple urban and semi-urban clinics out of Andhra Pradesh and Tamil Nadu, technicians and lab specialists expressed the need and desire for a device that could operate on both manual power and electricity. They cited India's frequent power cuts as the driver behind the need for the device. Laboratories in these clinics had an electric centrifuge, but when the power went out these devices were often inoperable. Some of these clinics had generators that would power the centrifuge if the power went out; however, in some of these locations the generators were insufficient due to the high power requirements of the electric centrifuge that the generator could not sustain. Some locations cited the high cost of generators that were required for the electric centrifuge they used as an issue. Multiple clinics expressed the need and willingness to pay for a centrifuge such as the present invention that could use both electric power when electricity was available and manual power when electricity was not available.

Each of the above use cases demonstrate that the present invention fulfills a long-felt need in the rural developing world communities that prior centrifuges, whether manual or electric, have been unable to fulfill. The present invention provides significant advantages over prior art devices in that it is easy to use, provides clear indications of time and speed requirements for sample separation, and its modular design allows use with and without electricity.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A modular centrifuge device for separating fluid samples, comprising:
 a base;
 a rotatable sample carrier having a holder configured to securably hold a sample container, the rotatable sample carrier hate enclosed in the base;
 a shaft coupled to the sample carrier;
 a power assembly selectively coupled to the shaft, the power assembly extending upward from the base;
 an electric motor selectively coupled to the shaft; and
 a manual power input device;
 wherein the centrifuge device is free standing, and
 wherein the centrifuge device is configured to toggle between a first configuration in which the manual power input device is engaged with the power assembly and operatively coupled to the shaft and the sample carrier for manually powering the centrifuge device and a second configuration in which the manual power input device is engaged with the electric motor causing the electric motor to operatively couple to the shaft and the sample carrier for electrically powering the centrifuge device.

2. The modular centrifuge device of claim 1, wherein the rotatable sample carrier has a plurality of holders, and wherein the holders swing out at an angle between 45 to 89 degrees from a vertical axis when rotated.

3. The modular centrifuge device of claim 1, wherein the sample container is chosen from the group consisting of: a snap in sample container and a rack of sample containers.

4. The modular centrifuge device of claim 1, wherein the base includes an access door for accessing the sample carrier.

5. The modular centrifuge device of claim 1, wherein the power assembly comprises a gear assembly or a belt assembly.

6. The modular centrifuge device of claim 5, wherein the gear assembly comprises a gear configuration chosen from the group consisting of: worm gears, spur gears, and combinations thereof.

7. The modular centrifuge device of claim 5, wherein the gear assembly is configured to achieve rotation of the sample carrier at least at 3000 rpm.

8. The modular centrifuge device of claim 1, wherein the manual power input device is chosen from the group consisting of: a handle, and a foot powered device.

9. The modular centrifuge device of claim 1, wherein the electric motor is powered by a mechanism chosen from the group consisting of: electric power from a wall socket, a battery, and solar power.

10. The modular centrifuge device of claim 1, wherein the manual power input device comprises a handle, and wherein toggling between the first configuration and the second configuration comprises manipulating the handle between a first position in which the handle engages the power assembly and a second position in which the handle engages the electric motor.

11. The modular centrifuge device of claim 1, further comprising a speed indicator and time indicator for indicating if a predetermined speed and predetermined or calculated time have been reached for rotating the sample carrier, wherein the speed indicator and time indicator are operatively connected to the sample carrier and chosen from the group consisting of: lights, sounds, control fluid samples, and mechanical alerts.

12. The modular centrifuge device of claim 1, further comprising the sample container containing a fluid sample, wherein the fluid sample is chosen from the group consisting of: blood, plasma, urine, sputum, spinal fluid, and saliva.

13. A method of centrifuging samples, comprising:
  securing a sample container containing a sample of bodily fluids within a holder of a centrifuge, the centrifuge comprising:
    a rotatable sample carrier comprising a plurality of holders,
    a shaft coupled to the sample carrier;
    a power assembly selectively coupled to the shaft,
    an electric motor selectively coupled to the shaft, and
    a manual power input device comprising a handle;
  selecting manual or electric power, wherein selecting manual or electric power comprises toggling between a first configuration in which the power assembly, shaft, and sample carrier are manually rotatable via user manipulation of the manual power input device and a second configuration in which the shaft and sample carrier are rotatable by the electric motor, and wherein toggling between the first configuration and the second configuration comprises toggling the handle between engagement with the power assembly and the electric motor;
  rotating the sample at a predetermined speed for a predetermined or calculated time to separate the sample; and
  alerting a user that the predetermined speed and predetermined or calculated time have been achieved.

14. The method of claim 13, further comprising inserting the sample container in a base of the centrifuge, and operating the centrifuge in a free standing manner.

15. The method of claim 13, wherein rotating the samples is accomplished through one or more of turning the handle, operating a foot powered device, and operating the electric motor.

16. The method of claim 13, wherein rotating the sample comprises rotating the shaft, the power assembly, and the sample carrier holding the sample.

17. The method of claim 13, wherein the predetermined speed of the sample carrier is at least 2000 rpm, causing the sample carrier to reach at least 2000 G's, and wherein the predetermined time is at least 3 minutes.

18. The method of claim 13, wherein alerting the user that the predetermined speed has been achieved comprises turning on a first light at the predetermined speed, and wherein alerting the user that the predetermined or calculated time has been achieved comprises turning on a second light at the predetermined time.

19. The method of claim 13, further comprising stopping operation of the centrifuge and gradually slowing rotation of the sample.

20. A modular centrifuge device for separating fluid samples, comprising:
  a rotatable sample carrier having a holder configured to securably hold a sample container;
  a shaft coupled to the sample carrier;
  a gear assembly selectively coupled to the shaft;
  an electric motor selectively coupled to the shaft; and
  a handle rotatable by a user;
  wherein the shaft and the sample carrier are selectively rotatable by manual or electric power via user toggling of the handle, and wherein toggling of the handle comprises manipulating the handle between: a first position in which the handle is engaged with the gear assembly and the gear assembly is operatively coupled to the shaft, and a second position in which the handle is engaged with the electric motor causing the electric motor to be operatively coupled to the shaft.

21. The centrifuge device of claim 20, further comprising:
  a base enclosing the sample carrier; and
  a housing extending upward from the base and enclosing the gear assembly.

22. A modular centrifuge device for separating fluid samples, comprising:
  a rotatable sample carrier having a holder configured to securably hold a sample container;
  a shaft coupled to the sample carrier;
  a power assembly selectively coupled to the shaft;
  an electric motor selectively coupled to the shaft; and
  a manual power input device comprising a handle;
  wherein the centrifuge device is configured to toggle between a first configuration in which the manual power input device is engaged with the power assembly and operatively coupled to the shaft and the sample carrier for manually powering the centrifuge device and a second configuration in which the manual power input device is engaged with the electric motor causing the electric motor to operatively couple to the shaft and the sample carrier for electrically powering the centrifuge device, and wherein toggling the centrifuge device between the first configuration and the second configuration comprises manipulating the handle between a first position in which the handle engages the power assembly and a second position in which the handle engages the electric motor.

\* \* \* \* \*

UNITED STATES PATENT AND TRADEMARK OFFICE
CERTIFICATE OF CORRECTION

PATENT NO. : 9,839,921 B2  
APPLICATION NO. : 14/776687  
DATED : December 12, 2017  
INVENTOR(S) : Carolyn Reed Yarina Page 1 of 1

It is certified that error appears in the above-identified patent and that said Letters Patent is hereby corrected as shown below:

In the Claims

Claim 1, Column 12, Line 54, "hate" should read -- being --

Signed and Sealed this  
Twenty-second Day of May, 2018

Andrei Iancu  
*Director of the United States Patent and Trademark Office*